Figure 16:
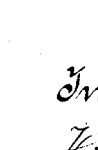

H. WILD.
SPIRIT LEVEL WITH A REFLECTING SYSTEM.
APPLICATION FILED AUG. 2, 1910.
1,034,049.
Patented July 30, 1912.
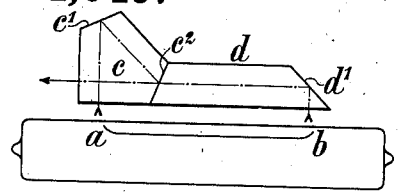 Fig.1 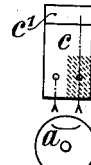 Fig.2
 Fig.3 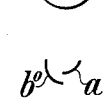 Fig.4
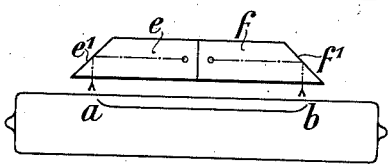 Fig.5 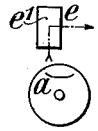 Fig.6
 Fig.7 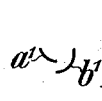 Fig.8
 Fig.9  Fig.10
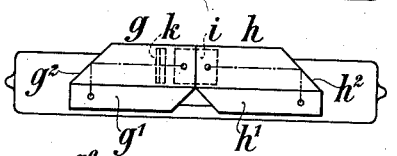 Fig.11  Fig.12
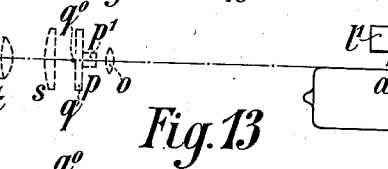
Fig.13
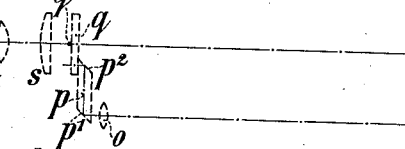
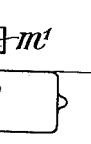
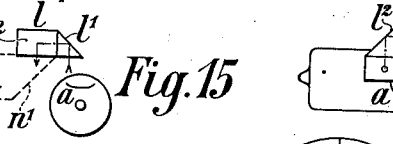 Fig.15  Fig.14
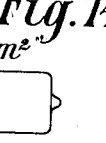
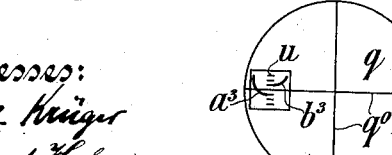

Witnesses:
Paul Krüger
Richard Hahn
Inventor:
Heinrich Wild ative position of the reflected images of the bubble
UNITED STATES PATENT OFFICE.

HEINRICH WILD, OF JENA, GERMANY, ASSIGNOR TO THE FIRM OF CARL ZEISS, OF JENA, GERMANY.

SPIRIT-LEVEL WITH A REFLECTING SYSTEM.

1,034,049.  Specification of Letters Patent. Patented July 30, 1912.

Application filed August 2, 1910. Serial No. 575,192.

*To all whom it may concern:*

Be it known that I, HEINRICH WILD, a citizen of the German Empire, residing at Carl-Zeiss strasse, Jena, in the Grand Duchy of Saxe-Weimar, Germany, have invented a new and useful Spirit-Level with a Reflecting System, of which the following is a specification.

The invention relates to an improvement in tubular spirit levels with a reflecting system, that projects the images of the two bubble ends close together. In the well-known constructions of this type it is easy to compare in the adjoining images, what position the vertices of each of the bubble end curves take up relatively to the system of marks, while for the rest the images behave in the same way as do the bubble ends themselves during direct observation: when the position of the bubble alters, the curves of the bubble ends are seen to shift conjointly relatively to the system of marks; in the same way the curves are seen to approach each other or retire, when an alteration takes place in the length of the bubble.

The object of the invention is to so arrange the reflecting system, that the relative position of the reflected images of the bubble ends is different for different positions of the bubble, and only the relative position of the curves of these images need be observed and the system of mark can be dispensed with. But such a method of observing the spirit level is in practice only then sufficient, when the reflecting system at the same time is constructed to render the relative position of the reflected images independent of the actual length of the bubble. Both conditions may be complied with according to the invention by means of an arrangement of the reflecting system, by which the images of the bubble ends are projected in such a position relative to each other, that their curves have not only, as previously, coincident or at any rate parallel axes of symmetry, but also have the same direction, i. e., are both convex and concave respectively on the same side. Bubble end images arranged in such a way shift relatively to each other, when the position of the bubble varies (when the one bubble end moves toward its convex, the other toward its concave side), in the direction of the axes of symmetry of the curves, but retain their relative position, when merely the length of the bubble varies (when both bubble ends move to the convex or both to the concave side), so that the relative distance apart of the vertices of the curves, as measured in the direction of the axes, can serve as an indication of the position of the bubble. As this distance apart of the curve vertices varies, when the reflecting system is shifted along the spirit level, such shifting represents a means of adjustment, that takes the place, in the level fitted according to the invention, of the usual adjustment by shifting the system of marks. The new method of observation without the use of a system of marks fixed over the spirit level offers, when applied to reversible levels, the special advantage, that the same reflecting system can be used for both main positions of the spirit level, or in other words, that only one such system need be combined with the spirit level. In the one main position of the spirit level, in which the reflecting system lies beneath the spirit level, the bubble is observed through the spirit level.

It is comparatively easy to construct reflecting systems, which give to the images of the bubble ends the indicated relative positions and any prescribed position relative to the spirit level. It is all the easier, as the shape of each curve is symmetrical, so that the curve branches, which belong to one and the same side of the bubble, can lie in the images either on one and the same side or on opposite sides.

In order to facilitate the observation of the relative distance apart of the curve vertices in the direction of the axes of symmetry, it is expedient to give the two effective entrance openings of the reflecting system such a position relative to the spirit level, that in each image only one branch of the curve is visible and the two visible branches turn their vertical points to each other. When in this case e. g. the arrangement of the reflecting system is such, that the axes of symmetry of the curves coincide, the distance between the vertical points indicates the position of the bubble. In general the spirit level and the reflecting system would be adjusted to each other in such a way, that the two vertical points coincide, when the bubble is in the zero position.

That position of the entrance openings of the reflecting system relative to the spirit level, by means of which the visibility of the curves is limited in the way described, differs from the usual position of these openings above the bubble ends mainly in this way, that each opening lies opposite only one lateral half of the corresponding bubble end. Whether the openings should be arranged on opposite sides of the bubble or on the same side, depends on whether the reflecting system only reproduces the curves of the bubble, which have an opposite direction, as being similarly directed, or whether at the same time each of two curve branches, which lie on one and the same side of the bubble, are placed in the images on opposite sides.

In the annexed drawing: Figure 1 is an elevation of a tubular spirit level fitted with a reflecting system according to the invention. Fig. 2 is an end view of this combination. Fig. 3 is a plan view of it. Fig. 4 shows the images of the bubble end curves, projected by the reflecting system, as they appear to the eye of the observer. Fig. 5 is an elevation of the spirit level with a second reflecting system. Fig. 6 is an end view of this combination. Fig. 7 is a plan view of it. Fig. 8 shows the images of the bubble end curves, projected by the reflecting system, as they appear to the eye of the observer. Fig. 9 is an elevation of the spirit level with a third reflecting system and a magnifying glass. Fig. 10 is an end view of this combination. Fig. 11 is a plan view of it. Fig. 12 shows the images of the bubble end curves, projected by the reflecting system, as they appear to the eye of the observer. Fig. 13 is an elevation of the spirit level with a fourth reflecting system and a sighting telescope. Fig. 14 is a plan view of this combination. Fig. 15 is an end view of the spirit level and the said reflecting system. Fig. 16 shows the mark disk of the telescope together with the real images of the bubble end curves projected in the plane of said disk.

In Figs. 1 to 3 the reflecting system reproduces the bubble ends $a$ and $b$ with correct lateral position of the curve branches. It consists of a prism $c$ with two reflecting surfaces $c^1$ and $c^2$ and of a prism $d$ with a single reflecting surface $d^1$. These prisms are cemented together by means of the reflecting surface $c^2$ and the exit surface of $d$. If the one or the other of the two surfaces which are cemented together were covered with a semitransparent coating of silver, or if any other coating, which is both transparent and reflecting, were interposed between the two surfaces, both branches of each curve of the bubble ends $a$ and $b$ would be visible. But, according to the drawing, of the two halves of the cemented joint, which lie above the one and the other side of the bubble, the one is supposed to be completely transparent and the other (shown shaded by dots in Figs. 2 and 3) completely reflecting. By this means the effective entrance opening of the reflecting prism $c$ is limited to that part of the entrance surface that lies above the same side of the bubble as the reflecting part of the cemented surface. Inversely, above this front side of the bubble the entrance surface of the prism $d$ is not effective as an entrance opening. The middle rays of the light, which passes through the effective entrance openings, are indicated by arrows. The eye of the observer is supposed to be to the left in the exit direction of the arrows. Only one branch, $a^0$ and $b^0$, of each of the two curves of the bubble ends is visible to him in the position shown in Fig. 4. The vertical points of the curve branches do not coincide, because the bubble, as may be seen from Fig. 1, deviates somewhat from its middle position to the right.

In Figs. 5 to 7 the eye of the observer is in the direction given by the arows in Figs. 6 and 7. Above the hinder side of the bubble two symmetrical reflecting prisms $e$ and $f$ are arranged, which in the first place direct the entering middle rays horizontally toward each other by means of their reflecting surfaces $e^1$ and $f^1$, and then, by means of a second pair of reflecting surfaces $e^2$ and $f^2$, in the same horizontal plane parallel to each other and perpendicular to the length of the spirit level. In this way a relative position of the reflected images is obtained, in which the curves are not only similarly directed, but their branches, belonging to one and the same side of the bubble, are found to be reproduced on opposite sides. Fig. 8 shows, how the two branch images $a^1$ and $b^1$ present themselves to the eye of the observer.

In the third arrangement, Figs. 9 to 11, each of the two symmetrical prisms $g$ and $h$ is effective with three reflecting surfaces, $g^1$, $g^2$, $g^3$ and $h^1$, $h^2$, $h^3$. The first pair of surfaces lies above the front side of the bubble. It leaves the entering middle rays parallel to each other and only deflects them horizontally. These horizontal middle rays are then treated by the remaining two pairs of reflecting surfaces in a similar way to those middle rays in the previous example, which enter in an upward direction. The middle rays emerging in an upward direction may then be conducted, as is indicated by the dotted lines, by means of a simple reflecting prism $i$ to a cylindrical magnifying glass $k$, behind which is the eye of the observer. To this eye the images $a^2$ and $b^2$ of the curve branches appear as shown in Fig. 12, i. e. again as in the last preceding example, directing their vertical points to each other, although the branches belong to one and the same side of the bubble.

In Figs. 13 to 15 the reflecting system of the spirit level is so combined by optical means with a sighting telescope system that the curve branches to be observed appear in the field of vision of the telescope. The reflecting system consists of two symmetrical prisms $l$ and $m$, of the three pairs of reflecting surfaces of which, $l^1 \ m^1$, $l^2 \ m^2$ and $l^3 \ m^3$, the first and the second have the same positions as the corresponding pairs of surfaces in the reflecting system according to Figs. 9 to 11, only that the first pair is arranged not above the front, but the hinder side of the bubble. This divergence is compensated in respect of the position of the images by this other one, namely, that the arrangement of the third pair of reflecting surfaces, $l^3 \ m^3$, adopted in this case, causes the middle rays to emerge in a downward instead of an upward direction. The rays are then taken up by a prism $n$, which directs them, after deflecting them by its surfaces $n^1$ and $n^2$, to a collective lens $o$. This collective lens, together with the reflecting surfaces $p^1$ and $p^2$ of a prism $p$, converts the ray system of the reflected images into real images. Their common plane coincides with the surface of the mark disk $q$, which is fitted with crossed lines $q^0$, the latter forming with the objective $r$ and the eye piece $s\ t$ the sighting telescope system. As shown in Fig. 16, the mark disk $q$ has in that part, which is opposite the reflecting surface $p^2$ of the prism $p$, a row of marks $u$, which can be used to measure the distance between the vertical points of the images $a^3$ and $b^3$ of the curve branches. The axes of symmetry of these images do not coincide in this case, but leave an intermediate space for the row of marks $u$. For this purpose the prisms $l$ and $m$ of the reflecting system are arranged a short distance apart.

I claim:

1. The combination, with a tubular spirit level, of a reflecting system arranged above said level and consisting of two component systems, at least one of which comprises a plurality of reflecting surfaces, the entrance surface of each component system being inclined to the horizontal plane and placed opposite one bubble end and the two component systems differing from each other so as to present the images of the bubble end curves with their convexities turned in the same direction.

2. The combination, with a tubular spirit level, of a reflecting system arranged above said level and consisting of two component systems, at least one of which comprises a plurality of reflecting surfaces, the entrance surface of each component system being inclined to the horizontal plane and placed opposite a lateral half of one bubble end and the two component systems differing from each other so as to present the images of the half bubble end curves with their convexities turned in the same direction and with their vertical points turned toward each other.

HEINRICH WILD.

Witnesses:
PAUL KRÜGER,
ALFRED MACKEDANZ.